United States Patent
Zhao et al.

(10) Patent No.: US 11,100,116 B2
(45) Date of Patent: Aug. 24, 2021

(54) RECOMMENDATION SYSTEMS IMPLEMENTING SEPARATED ATTENTION ON LIKE AND DISLIKE ITEMS FOR PERSONALIZED RANKING

(71) Applicant: INTERNATIONAL BUSINESS MACHINES CORPORATION, Armonk, NY (US)

(72) Inventors: Shiwan Zhao, Beijing (CN); Zhi Qiao, Beijing (CN); Zhi Hu Wang, Beijing (CN); Li Zhang, Beijing (CN); Zhong Su, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 248 days.

(21) Appl. No.: 16/175,102

(22) Filed: Oct. 30, 2018

(65) Prior Publication Data
US 2020/0134034 A1 Apr. 30, 2020

(51) Int. Cl.
*G06F 16/00* (2019.01)
*G06F 16/2457* (2019.01)
*G06F 7/14* (2006.01)
*G06F 16/56* (2019.01)
*G06F 16/9535* (2019.01)

(52) U.S. Cl.
CPC .......... *G06F 16/24578* (2019.01); *G06F 7/14* (2013.01); *G06F 16/56* (2019.01); *G06F 16/9535* (2019.01)

(58) Field of Classification Search
None
See application file for complete search history.

(56) References Cited

U.S. PATENT DOCUMENTS

| | | | |
|---|---|---|---|
| 7,685,232 B2 | 3/2010 | Gibbs et al. | |
| 8,341,098 B2* | 12/2012 | Tateno | G06F 16/64 706/12 |
| 8,626,604 B1* | 1/2014 | Gandhi | G06Q 30/0254 705/26.35 |
| 9,009,096 B2* | 4/2015 | Pinckney | G06F 16/9535 706/52 |
| 9,348,898 B2 | 5/2016 | Nice et al. | |

(Continued)

OTHER PUBLICATIONS

Niu, "Neural Personalized Ranking Image Recommendation", Proceedings of the 11th ACM International Conference on Web Search and Data Mining, Feb. 2018, pp. 423-431.

(Continued)

*Primary Examiner* — Debbie M Le
(74) *Attorney, Agent, or Firm* — Tutunjian & Bitetto, P.C.; Joseph Petrokaitis

(57) ABSTRACT

A computer-implemented method for implementing separated attention on like and dislike items for personalized ranking includes performing an element-wise product on a user embedding and a final like item embedding to generate a first vector. The method further includes performing an element-wise product on the user embedding and a final dislike item embedding to generate a second vector. The method further includes computing a probability that the user prefers the like item to the dislike item based on the first and second vectors, and generating one or more item recommendations including one or more electronic images for the user using the probability.

15 Claims, 7 Drawing Sheets

(56) References Cited

U.S. PATENT DOCUMENTS

| | | | |
|---|---|---|---|
| 9,418,375 B1* | 8/2016 | Cunico | G06F 40/40 |
| 10,366,399 B1* | 7/2019 | Rahmani | G06Q 10/04 |
| 10,540,396 B2* | 1/2020 | Ye | G06F 3/0484 |
| 10,824,941 B2* | 11/2020 | Volkovs | G06N 3/08 |
| 2017/0140262 A1 | 5/2017 | Wilson et al. | |
| 2017/0185894 A1* | 6/2017 | Volkovs | G06N 3/0454 |
| 2019/0012573 A1* | 1/2019 | Oyamada | G06N 3/08 |
| 2019/0164069 A1* | 5/2019 | Zhivotvorev | G06Q 30/0631 |
| 2019/0251435 A1* | 8/2019 | Shiebler | G06N 3/08 |
| 2019/0370854 A1* | 12/2019 | Gao | H04L 67/22 |

OTHER PUBLICATIONS

Gong, "An Item Based Collaborative Filtering Using BP Neural Networks Prediction", 2009 International Conference on Industrial and Information Systems, Jun. 2009, 3 pages.

Nguyen, "NPE: Neural Personalized Embedding for Collaborative Filtering", Proceedings of the 27th International Joint Conference on Artificial Intelligence, May 2018 pp. 1583-1589.

Rendle, "BPR: Bayesian Personalized Ranking Implicit Feedback", Proceedings of the 25th Conference on Uncertainty in Artificial Intelligence, Jun. 2009, pp. 452-461.

* cited by examiner

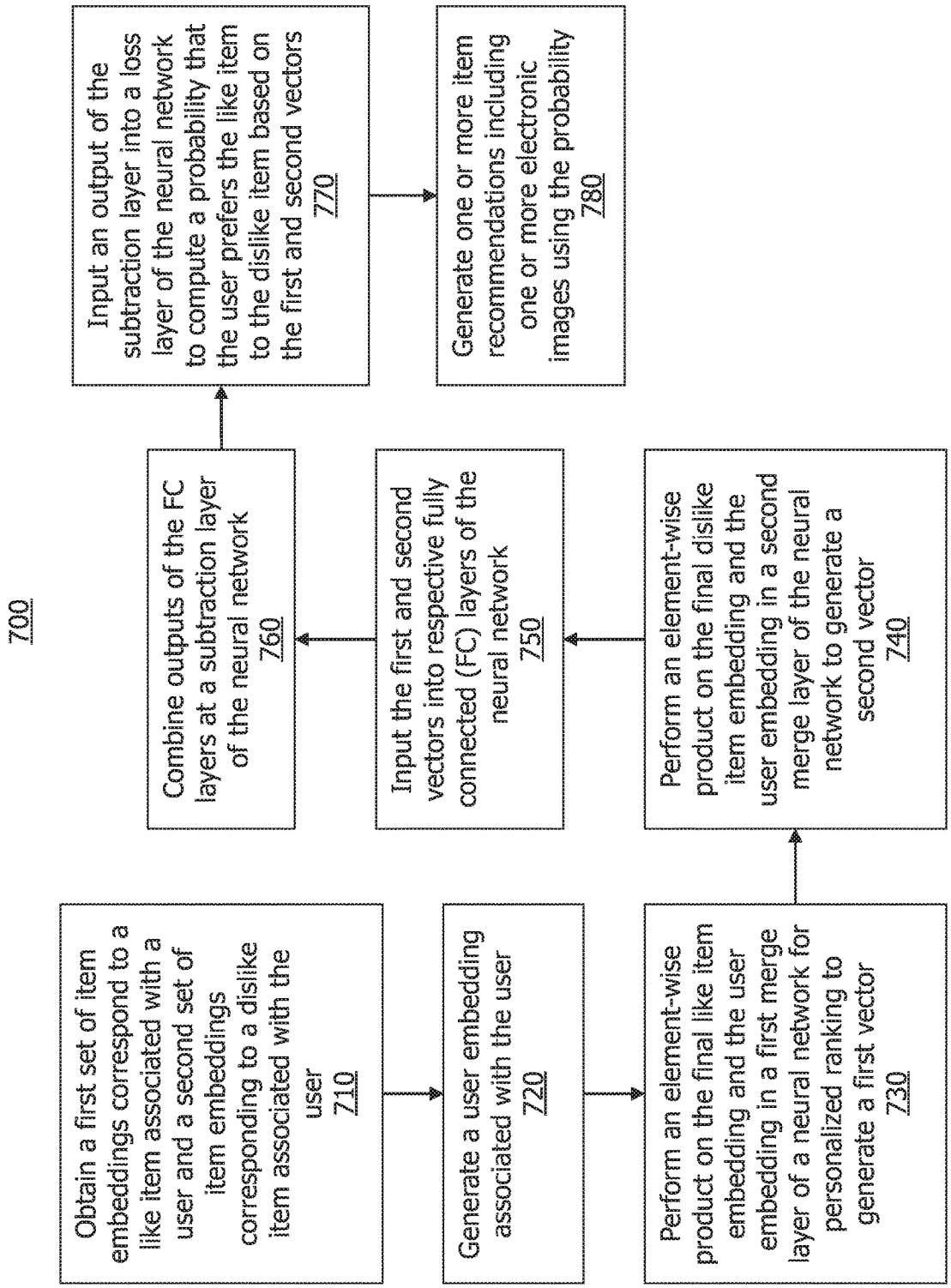

RECOMMENDATION SYSTEMS IMPLEMENTING SEPARATED ATTENTION ON LIKE AND DISLIKE ITEMS FOR PERSONALIZED RANKING

BACKGROUND

Technical Field

The present invention generally relates to machine learning, and more particularly to recommendation systems implementing separated attention on like and dislike items for personalized ranking.

Description of the Related Art

Recommendation or recommender systems are information filtering systems that use artificial intelligence and machine learning algorithms to predict user preferences or ratings of items to generate recommendations of the items. Generally, recommendation systems can produce a list of recommendations through collaborative filtering and/or content-based filtering. Collaborative filtering works by building a predictive model for recommending items to a user based on the user's past behavior and decisions and/or behaviors and decisions made by other users, and do not require a knowledge of item attributes. Content-based filtering works by employing a series of discrete characteristics of an item liked by a user for recommending additional items with similar properties to the item like by the user. Hybrid recommendation systems employ a combination of collaborative filtering and content-based filtering. Recommendation systems can be used to generate recommendations for a variety of different types of items, including but not limited to movies, music, books, products, clothing, people, jokes, restaurants, insurance, online dating, social media pages, etc.

SUMMARY

In accordance with an embodiment of the present invention, a system for implementing separated attention on like and dislike items for personalized ranking is provided. The system includes a memory device for storing program code and at least one processor device operatively coupled to the memory device. The at least one processor device is configured to execute program code stored on the memory device to perform, in a first merge layer of a neural network for personalized ranking, an element-wise product on a user embedding and a final like item embedding to generate a first vector. The final like embedding is included in a first set of item embeddings corresponding to a like item associated with a user. The at least one processor device is further configured to perform, in a second merge layer of the neural network, an element-wise product on the user embedding and a final dislike item embedding to generate a second vector. The final dislike item embedding is included in a second set of item embeddings corresponding to a dislike item associated with the user. The at least one processor device is further configured to compute a probability that the user prefers the like item to the dislike item based on the first and second vectors, and generate one or more item recommendations including one or more electronic images for the user using the probability.

In accordance with another embodiment of the present invention, a computer-implemented method for implementing separated attention on like and dislike items for personalized ranking is provided. The method includes performing, in a first merge layer of a neural network for personalized ranking, an element-wise product on a user embedding and a final like item embedding to generate a first vector. The final like embedding is included in a first set of item embeddings corresponding to a like item associated with a user. The method further includes performing, in a second merge layer of the neural network, an element-wise product on the user embedding and a final dislike item embedding to generate a second vector. The final dislike item embedding is included in a second set of item embeddings corresponding to a dislike item associated with the user. The method further includes computing a probability that the user prefers the like item to the dislike item based on the first and second vectors, and generating one or more item recommendations including one or more electronic images for the user using the probability.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein:

FIG. 7 is a block/flow diagram of a system/method for implementing separated attention on like and dislike items for personalized ranking, in accordance with an embodiment of the present invention.

DETAILED DESCRIPTION

User and item representation learning can play a key role in recommendation algorithms employing artificial intelligence and machine learning techniques (e.g., matrix factorization and deep learning). In practice, users can like and dislike the same item with different reasons. For example, matrix factorization can be implemented as a neural network by user/item embedding, where an item embedding is generated from an input item, a user embedding is generated from an input user, and an element-wise product is perform to generate an input into a fully connected (FC) layer of the neural network. Existing approaches can model an item with shared item embedding and/or with separated item embedding. However, existing shared item embedding approaches ignore the difference between "like" and "dislike" behavior of an item and thus cannot support the difference between "like" and "dislike" behaviors of an item, and existing separated item embedding approaches lose the connections between the "like" and "dislike" behavior of an item.

To address at least the above-noted shortcomings of these existing approaches, the embodiments described herein provide for systems and methods for implementing separated attention on like and dislike items for personalized ranking. For example, the embodiments described herein can simultaneously model both the difference and connections between "like" and "dislike" behavior of the same item. By inheriting from the same representation and using an attention mechanism to compute weights for a weighted representation, the weighted representation of the "like" and "dislike" of the same item can be connected, while being different.

For example, in one embodiment, a like item embedding and a dislike item embedding of can be generated from a parent like item embedding and a parent dislike item embedding, respectively. Attention can be computed between the like item embedding and the parent like item embedding to generate a final like item embedding, as well as the dislike item embedding and the parent dislike item embedding to generate a final dislike item embedding. An element-wise product corresponding to the like item can be generated based on the final like item embedding and a user embedding, and an element-wise product corresponding to the dislike item can be generated based on the final dislike item embedding and the user embedding. Each element-wise product can be fed into respective fully connected (FC) layers, and the outputs of the FC layers can be input into a loss or cost function for use by a recommendation system to recommend items to the user.

Figure 1:
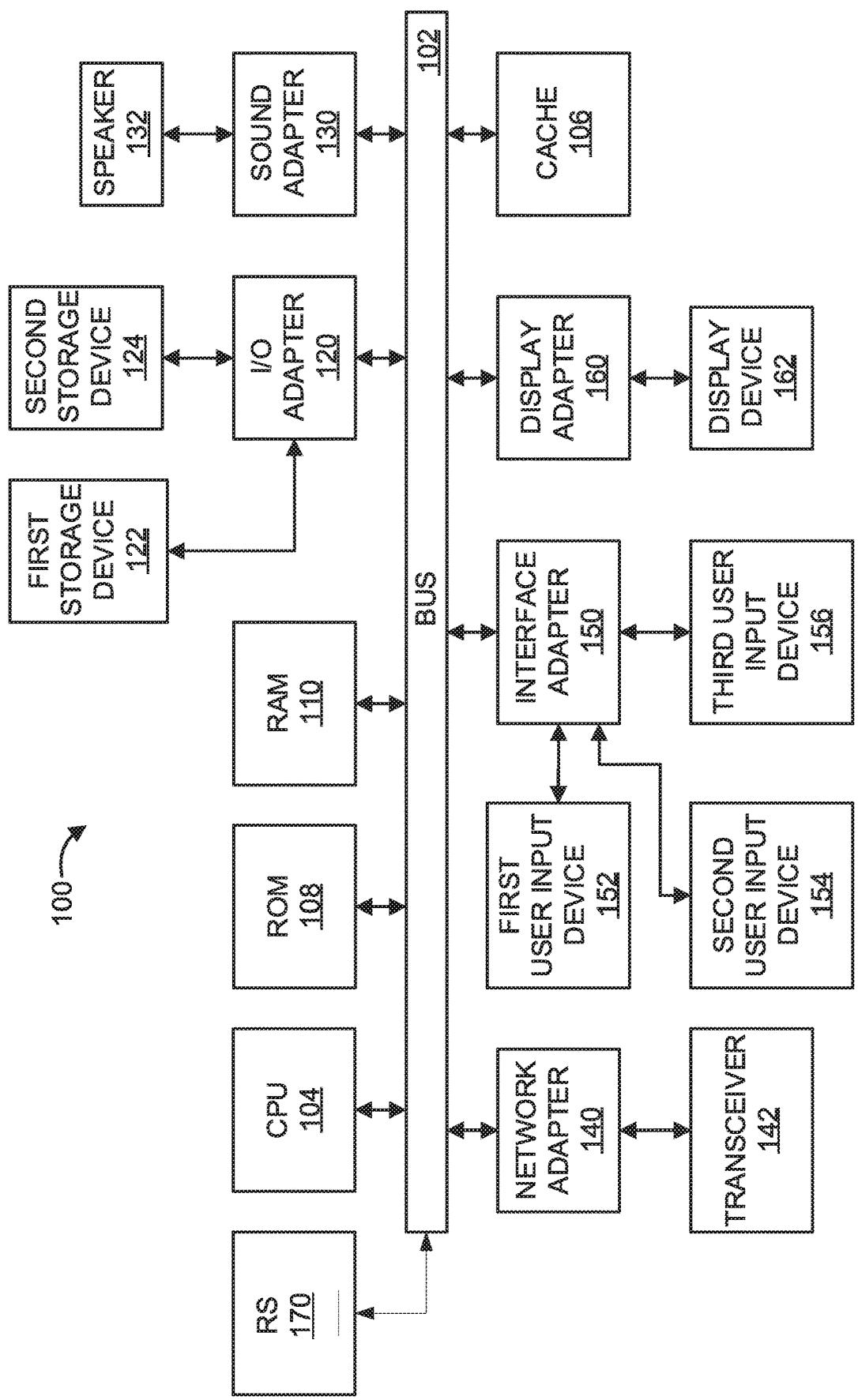
FIG. 1 is a block diagram of a processing system, in accordance with an embodiment of the present invention.

Referring now to the drawings in which like numerals represent the same or similar elements and initially to FIG. 1, an exemplary processing system 100 to which the present invention may be applied is shown in accordance with one embodiment. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Recommendation system (RS) component 170 may be operatively coupled to system bus 102. RS component 170 is configured to perform one or more of the operations described below. RS component 170 can be implemented as a standalone special purpose hardware device, or may be implemented as software stored on a storage device. In the embodiment in which RS component 170 is software-implemented, although the anomaly detector is shown as a separate component of the computer system 100, RS component 170 can be stored on, e.g., the first storage device 122 and/or the second storage device 124. Alternatively, RS component 170 can be stored on a separate storage device (not shown).

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
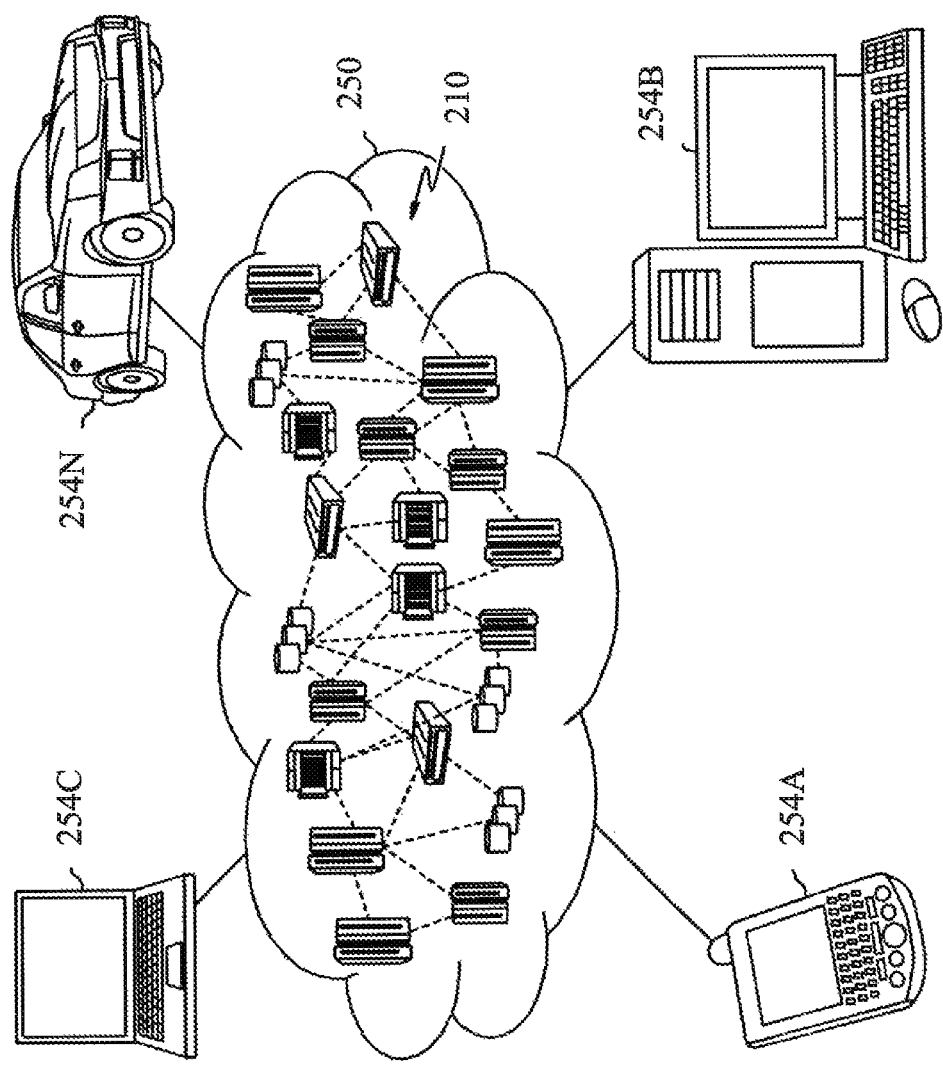
FIG. 2 is a block diagram showing an illustrative cloud computing environment having one or more cloud computing nodes with which local computing devices used by cloud consumers communicate, in accordance with an embodiment of the present invention.

Referring now to FIG. 2, illustrative cloud computing environment 250 is depicted. As shown, cloud computing environment 250 includes one or more cloud computing nodes 210 with which local computing devices used by cloud consumers, such as, for example, personal digital assistant (PDA) or cellular telephone 254A, desktop computer 254B, laptop computer 254C, and/or automobile computer system 254N may communicate. Nodes 210 may communicate with one another. They may be grouped (not shown) physically or virtually, in one or more networks, such as Private, Community, Public, or Hybrid clouds as described hereinabove, or a combination thereof. This allows cloud computing environment 150 to offer infrastructure, platforms and/or software as services for which a cloud consumer does not need to maintain resources on a local computing device. It is understood that the types of computing devices 254A-N shown in FIG. 2 are intended to be illustrative only and that computing nodes 210 and cloud computing environment 250 can communicate with any type of computerized device over any type of network and/or network addressable connection (e.g., using a web browser).

Figure 3:
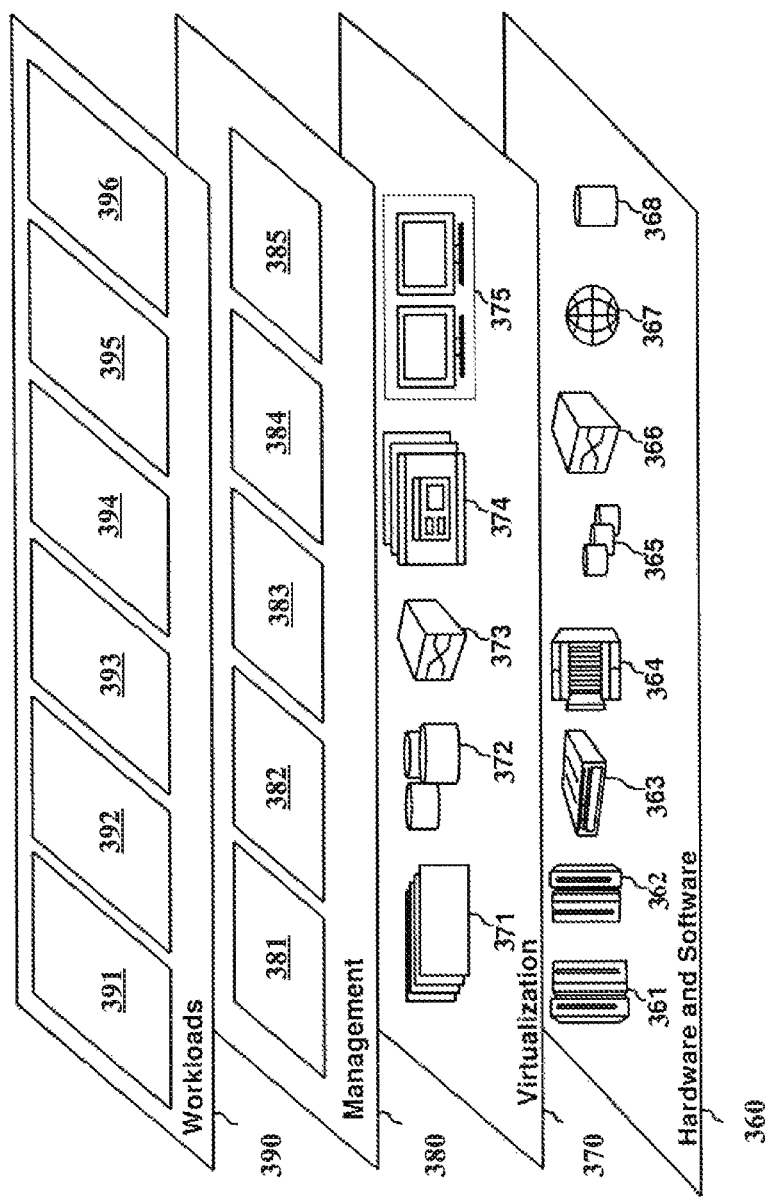
FIG. 3 is a block diagram showing a set of functional abstraction layers provided by a cloud computing environment, in accordance with an embodiment of the present invention.

Referring now to FIG. 3, a set of functional abstraction layers provided by cloud computing environment 250 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 360 includes hardware and software components. Examples of hardware components include: mainframes 361; RISC (Reduced Instruction Set Computer) architecture based servers 362; servers 363; blade servers 364; storage devices 365; and networks and networking components 366. In some embodiments, software components include network application server software 367 and database software 368.

Virtualization layer 370 provides an abstraction layer from which the following examples of virtual entities may be provided: virtual servers 371; virtual storage 372; virtual networks 373, including virtual private networks; virtual applications and operating systems 374; and virtual clients 375.

In one example, management layer 380 may provide the functions described below. Resource provisioning 381 provides dynamic procurement of computing resources and other resources that are utilized to perform tasks within the cloud computing environment. Metering and Pricing 382 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 383 provides access to the cloud computing environment for consumers and system administrators. Service level management 384 provides cloud computing resource allocation and management such that required service levels are met. Service Level Agreement (SLA) planning and fulfillment 385 provide pre-arrangement for, and procurement of, cloud computing resources for which a future requirement is anticipated in accordance with an SLA.

Workloads layer 390 provides examples of functionality for which the cloud computing environment may be utilized. Examples of workloads and functions which may be provided from this layer include: mapping and navigation 391; software development and lifecycle management 392; virtual classroom education delivery 393; data analytics processing 394; transaction processing 395; and recommendation system processing 396.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 4:
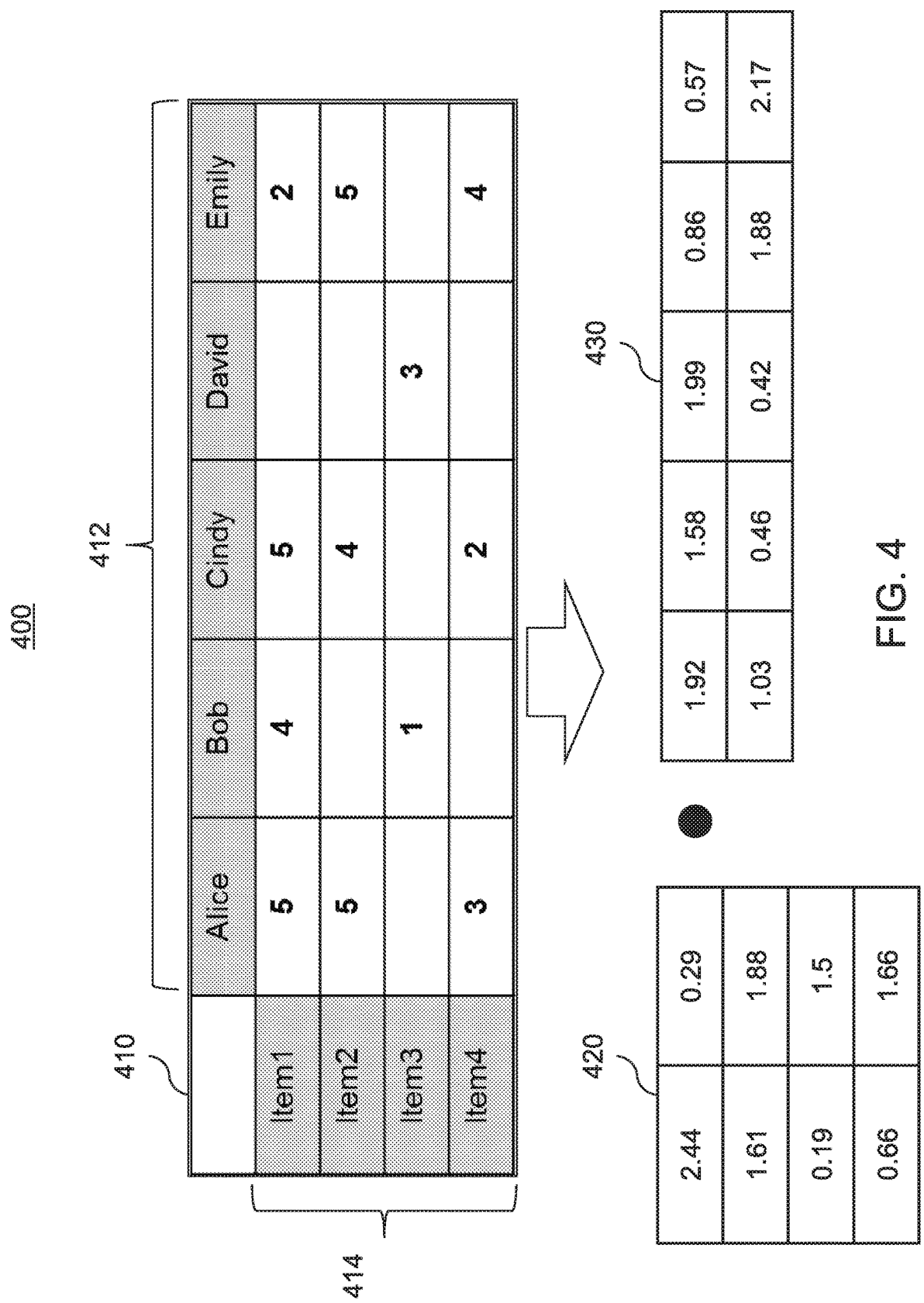
FIG. 4 is a block diagram showing matrix factorization, in accordance with an embodiment of the present invention.

With reference to FIG. 4, a block diagram 400 is provided illustrating an example of latent factor matrix factorization that can be used by a recommendation system in accordance with the embodiments described herein. The recommendation system can employ e.g., collaborative filtering content-based filtering, or a combination thereof (e.g., a hybrid recommendation system) to recommend items to users. The recommendations provided can include electronic images corresponding to the recommended items.

As shown in FIG. 4, a user-item interaction matrix 410 includes users 412 and items 414. In this illustrative example, the users 412 include Alice, Bob, Cindy, David and Emily, and the items 414 include Item1, Item2, Item3 and Item4. The items 414 can each be represented to the user via respective electronic images.

Each value in the matrix corresponds to a preference that a user has for a corresponding item ranging from 1-5, where 1 indicates a strong dislike preference, 3 indicates a neutral preference, and 5 indicates a strong like preference. For example, the value corresponding to Alice and Item1 is 5, meaning that Alice has a strong like preference for Item1. As another example, the value corresponding to Bob and Item3 is 1, meaning that Bob has a strong dislike preference for Item3.

The preference that a given user has for a given item can be determined from explicit feedback from the given user for the given item and/or implicit feedback determined based on user actions associated with the given item. Implicit feedback can be determined from, for example, social media activity (e.g., sharing an item or liking an item on a social media platform), tracking user clicks related to an item, user purchases, view times (e.g., viewing an item for longer is a signal of user interest), etc. It is comparably easier to collect implicit feedback for a user as compared to explicit feedback from the user, since implicit feedback can be collected automatically in real-time based on actions of the user. Accordingly, obtaining implicit feedback can obviate the need for a user to manually provide item preferences or ratings in order for the recommendation system to recommend items to the user.

Generally, preference prediction in accordance with the embodiments described herein can be interpreted as filling in missing entries in the matrix 410. To predict preferences, a matrix factorization model can be used to factor or decompose the matrix 410 into a product of matrices including an item factor matrix 420 and a user factor matrix 430. That is, the item factor matrix 420 characterizes item attributes (e.g., characteristics of images) and the user factor matrix 430 characterizes user preferences. The matrices 420 and 430, when multiplied together via matrix multiplication, result in the matrix 410. The factor size in this illustrative example is 2.

Generally, matrix factorization can be used to represent an m×n matrix A having rank r as a product of an m×r matrix X and an r×n matrix Y (A=XY). With this in mind, the number of values corresponding to matrix A equals mn, while the number of values corresponding to matrices X and Y equals mr+rn=r(m+n). That is, matrix factorization can reduce the matrix A into parts to reduce the dimensionality of the user-item preference space. If the rank r is sufficiently small, then the number of values that would need to be stored for matrices X and Y can be smaller than the number of values that would need to be stored for matrix A. Therefore, matrix factorization can decrease an amount of memory storage resources used by a computer system to perform a task based on the matrix A, such as, e.g., a recommendation task performed by a recommendation system. Accordingly, matrix factorization can improve the ability of a processor to implement a recommendation system in accordance with the embodiments described herein.

Matrices 420 and 430 can be determined as follows. First, matrices 420 and 430 can be randomly initialized. Then, for each known rating in the matrix 410, matrices 420 and 430 can be used to compute the rating prediction, and the loss with true and predicted values. With the computed loss, the matrices 420 and 430 can be adjusted to minimize the loss with, e.g., a stochastic gradient descent approach. The matrices 420 and 430 can be obtained after performing a sufficient number of iterations over all known ratings in matrix 410.

In one embodiment, the recommendation system can train a neural network for personalized ranking based on the matrix factorization model. For example, the recommendation system can adapt Bayesian Personalized Ranking (BPR) from implicit feedback to the matrix factorization model within an algorithm to predict and rank preference scores of items. More specifically, the neural network can be trained to predict user preferences and thus provide item recommendations for a user u based on a pair of items i and j, where user u has provided a preference for item i over item j. As used herein, item i is deemed a "like" item and item j is deemed a "dislike" item. The neural network described herein can implement separated attention on like and dislike items for personalized ranking. Further details regarding the training of the neural network for predicting user preferences will be described below with reference to FIGS. 5-7.

Figure 5:
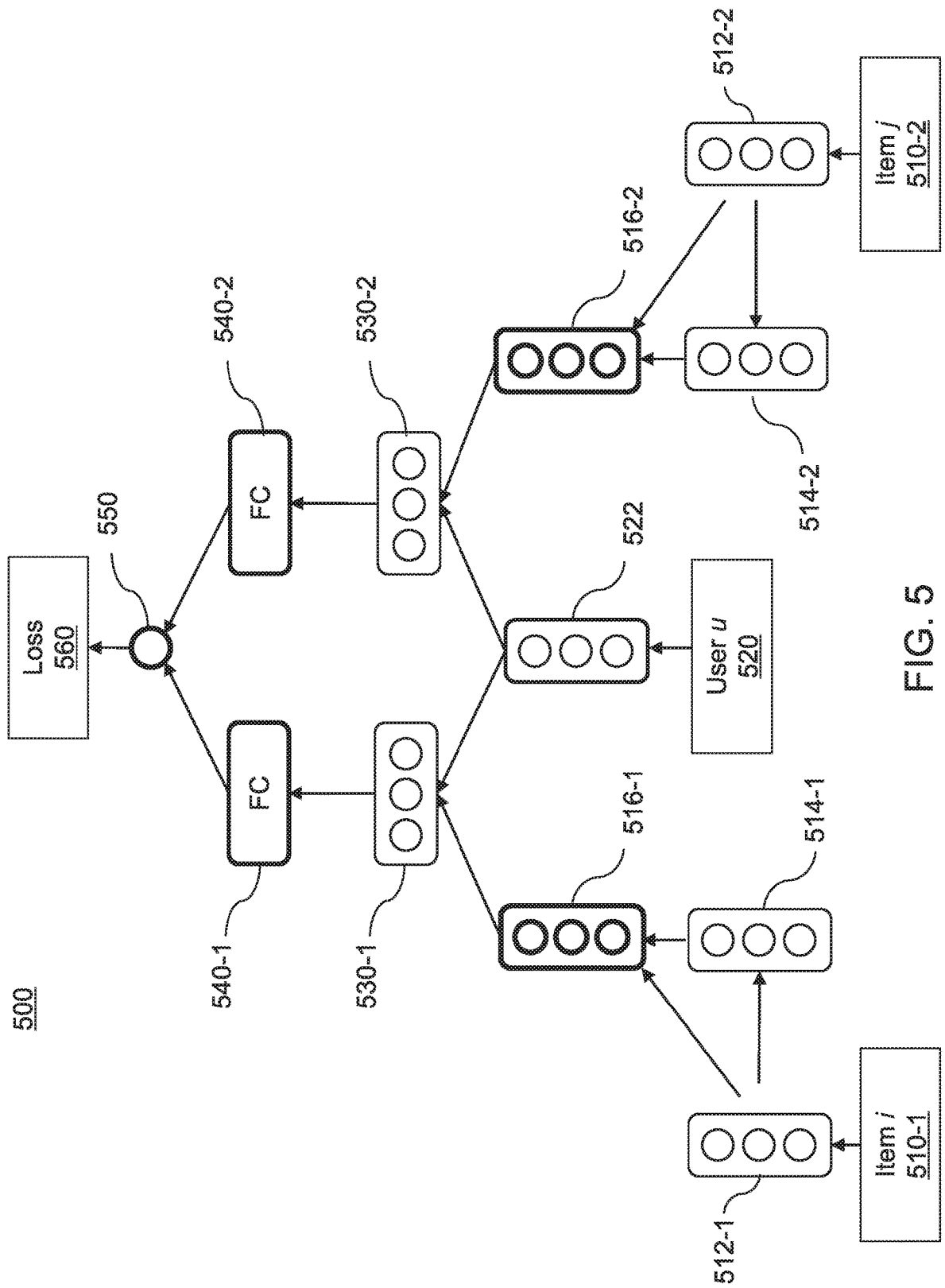
FIG. 5 is a block/flow diagram of a neural network implementing separated attention on like and dislike items for personalized ranking, in accordance with an embodiment of the present invention.

With reference to FIG. 5, a block/flow diagram is provided illustrating a neural network system 500 for implementing separated attention on like and dislike items for personalized ranking.

As shown, for a like item i 510-1, a parent like item embedding 512-1 and a like item embedding 514-1 are generated (e.g., randomly initialized), and a final like item embedding 516-1 is generated from the parent like item embedding 512-1 and the like item embedding 514-1. Similarly, for a dislike item j 510-2, a parent dislike item embedding 512-2 and a dislike item embedding 514-2 are generated (e.g., randomly initialized), and a final dislike item embedding 516-2 is generated from the parent dislike item embedding 512-2 and the dislike item embedding 514-2. Further details regarding embeddings 512-516 will now be described with reference to FIG. 6.

Figure 6:
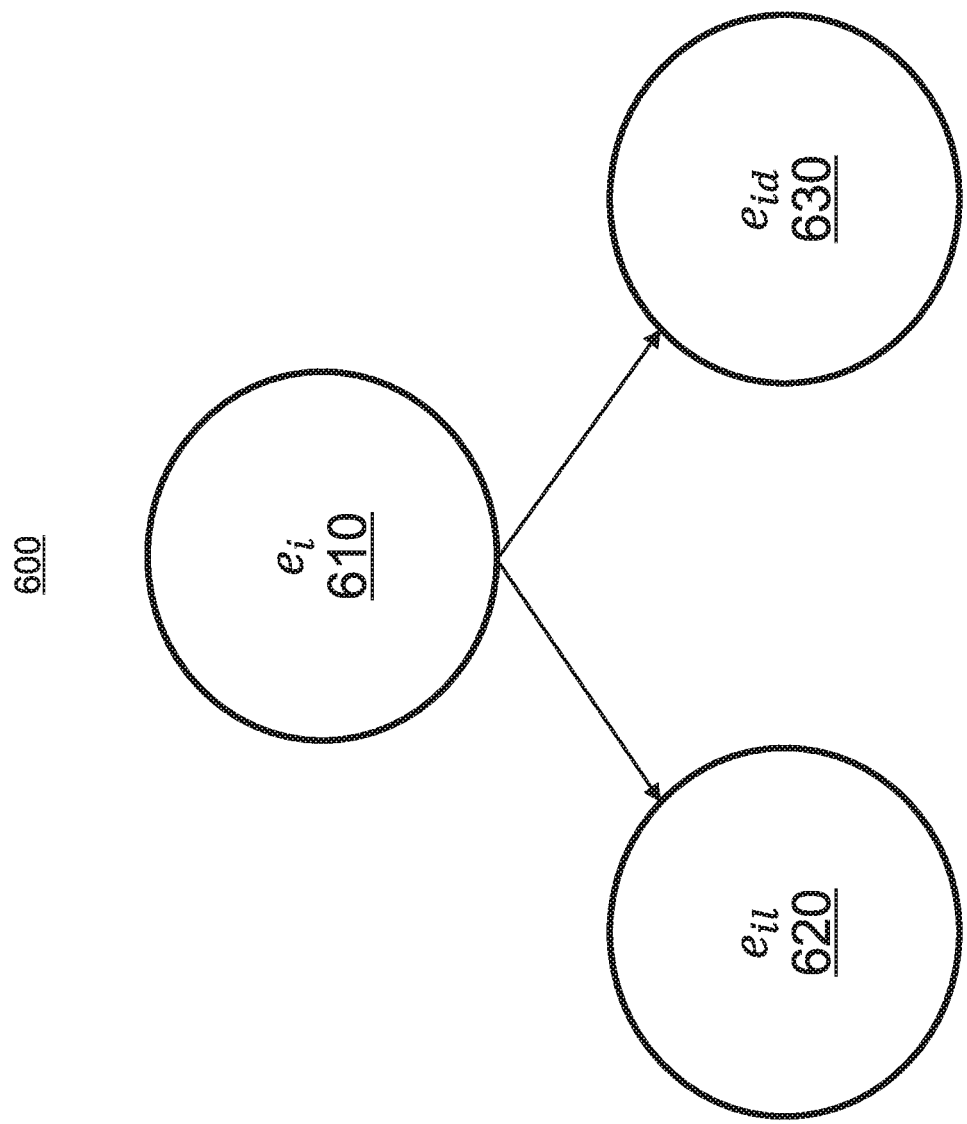
FIG. 6 is a diagram showing item embedding, in accordance with an embodiment of the present invention.

With reference to FIG. 6, a diagram 600 is provided illustrating item embeddings that can be used by a recommendation system in accordance with the embodiments described herein. As shown, there are three item embeddings for an item i, including a parent item embedding, $e_i$, 610, a like item embedding, $e_{il}$, 620 and a dislike item embedding, $e_{id}$, 630. Although $e_{il}$ and $e_{id}$ are different, they can share common features since they are both related to $e_i$ via an attention mechanism. The item embeddings 610-630 can be randomly initialized and updated during training.

A final like item embedding, $e_i^{like}$, and a final dislike item embedding, $e_i^{dislike}$, can then be computed from $e_{il}$ and $e_{id}$, respectively. The final like and dislike item embeddings can be computed based on alignment measurements corresponding to $e_{il}$ and $e_{id}$, respectively. For example, $e_i^{like}$ can be computed as follows:

$$a_1^{like} = u^T \tanh(W_1 e_{il} + W_2 e_i),$$

$$a_2^{like} = u^T \tanh(W_1 e_{il} + W_2 e_{il}),$$

$$\beta_i^{like} = \frac{\exp(a_i^{like})}{\sum_k \exp(a_k^{like})}, \text{ and}$$

$$e_i^{like} = \beta_1^{like} e_i + \beta_2^{like} e_{il},$$

where $W_1 \in R^{d \times d}$, $W_2 \in R^{d \times d}$, $u \in R^d$ are weights, d is the size of item embedding. $a_1^{like}$ is an alignment measurement between $e_{il}$ 620 and $e_i$ 610, $a_2^{like}$ is an alignment measurement between $e_{il}$ 620 and $e_{il}$ 620 itself, $\beta_i^{like}$ is a normalization of the corresponding $\alpha_i^{like}$ using softmax. Therefore, $e_i^{like}$ can be computed as a weighted sum of $e_i$ 610 and $e_{il}$ 620. The final dislike item embedding, $e_i^{dislike}$, can be computed in a similar manner as $e_i^{like}$ using $e_i$ 610 and $e_{id}$ 630.

Referring back to FIG. 5, for a user u 520, a user embedding 522 is generated. In one embodiment, the user embedding 522 is randomly initialized. An element-wise product is performed on the final like item embedding 516-1 and the user embedding 520 to generate vector 530-1, and an element-wise product is performed on the final dislike item embedding 516-2 and the user embedding 520 to generate vector 530-2. The element-wise products can be performed in respective merge layers. The element-wise products are similar to matrix factorization.

As further shown, vector 530-1 is input into fully connected neural network layer (FC) 540-1 and vector 530-2 is input into FC 540-2. The outputs of FC 540-1 and 540-2 are combined at subtraction layer 550, and then provided as input into loss layer 560 to compute a probability that the user u 520 prefers item i 510-1 to item j 510-2 (e.g., prefers the like item to the dislike item).

For example, a score corresponding to the item i 510-1, $S_{ui}$, and a score corresponding to the item j 510-2, $S_{uj}$, can be output at FC 540-1 and 540-2, respectively, and provided as inputs to the subtraction layer 550. The subtraction layer 550 can output the difference between the scores as $S_\delta = S_{ui} - S_{uj}$. The difference $S_\delta$ can be transformed into a probability (that the user u 520 prefers the item i 510-1 to the item j 510-2) using any suitable function(s) in accordance with the embodiments described herein. In one embodiment, the difference $S_\delta$ can be transformed into the probability using the sigmoid function. Given the probability, the loss function can be computed at the loss layer 560 using any suitable loss function in accordance with the embodiments described herein. For example, the loss layer 560 can employ a cross-entropy (or log loss) function.

The output of the loss layer 560 can be used by a recommendation system implementing the neural network 500 to recommend items (e.g., images of items) to the user 520 based on the matrix factorization model. For example, in an illustrative embodiment, the recommendation system can be implemented in the context of an electronic commerce platform (e.g., website) that recommends a personalized list of items that the user 520 may be interested in purchasing based on implicit behavior of the user 520 (e.g., past purchases of the user 520).

With reference to FIG. 7, a block/flow diagram is provided illustrating a system/method 700 for implementing separated attention on like and dislike items for personalized ranking.

At block 710, a first set of item embeddings corresponding to a like item associated with a user and a second set of item embeddings corresponding to a dislike item associated with the user are obtained. It can be assumed that the user has expressed a "like" preference in the like item and a "dislike" preference in the dislike item. In one embodiment, the preferences are obtained based on implicit feedback.

The first set of item embeddings can include a parent like item embedding, a like item embedding and a final like item embedding, and the second set of item embeddings can include a parent dislike item embedding, a dislike item embedding and a final dislike item embedding. The parent item embeddings and the item embeddings can be randomly initialized, and the final item embeddings can be generated from their respective parent item embeddings and item embeddings. Further details regarding the first and second sets of item embeddings are described above with reference to FIGS. 5 and 6.

At block 720, a user embedding associated with the user is generated. In one embodiment, the at least one user embedding is randomly initialized.

At block 730, an element-wise product is performed on the final like item embedding and the user embedding in a first merge layer of a neural network for personalized ranking to generate a first vector, and, at block 740, an element-wise product is performed on the final dislike item embedding and the user embedding in a second merge layer of the neural network to generate a second vector.

At block 750, the first and second vectors are input into respective fully connected (FC) layers of the neural network.

At block 760, outputs of the FC layers are combined at a subtraction layer of the neural network.

At block 770, an output of the subtraction layer is input into a loss layer of the neural network to compute a probability that the user prefers the like item to the dislike item.

For example, a score corresponding to the like item, $S_{ui}$, and a score corresponding to the dislike item, $S_{uj}$, can be output at the respective FC layers, and provided as inputs to the subtraction layer. The subtraction layer can output the difference between the scores as $S_\delta = S_{ui} - S_{uj}$. The difference $S_\delta$ can be transformed into a probability (that the user prefers the like item to the dislike item) using any suitable function(s) in accordance with the embodiments described herein. In one embodiment, the difference $S_\delta$ can be transformed into the probability using the sigmoid function. Given the probability, the loss function can be computed at the loss layer using any suitable loss function in accordance with the embodiments described herein. For example, the loss layer can employ a cross-entropy (or log loss) function.

At block 780, one or more item recommendations including one or more electronic images for the user are generated using the probability.

Further details regarding the system/method 700 of FIG. 7 are described above with reference to FIGS. 4-6.

Having described preferred embodiments of recommendation systems implementing separated attention on like and dislike items for personalized ranking (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed:

1. A system for implementing separated attention on like and dislike items for personalized ranking, comprising:
   a memory device for storing program code; and
   at least one processor device operatively coupled to the memory device and configured to execute program code stored on the memory device to:
      perform, in a first merge layer of a neural network for personalized ranking, an element-wise product on a user embedding and a final like item embedding to generate a first vector, the final like item embedding being computed based on a like item embedding corresponding to a like item associated with a user;
      perform, in a second merge layer of the neural network, an element-wise product on the user embedding and a final dislike item embedding to generate a second vector, the final dislike item embedding being computed based on a dislike item embedding corresponding to a dislike item associated with the user, wherein the like and dislike item embeddings are related to a same parent item embedding via an attention mechanism;
      compute a probability that the user prefers the like item to the dislike item based on the first and second vectors; and
      generate one or more item recommendations including one or more electronic images for the user using the probability.

2. The system of claim 1, wherein the at least one processor device is further configured to execute program code stored on the memory device to randomly initialize the user embedding.

3. The system of claim 1, wherein the at least one processor is further configured to execute program code stored on the memory device to obtain the final like item embedding by:
   computing a first alignment measurement between the parent item and like item embeddings;
   computing a second alignment measurement between the like item embedding and the like item embedding itself; and
   compute the final like item embedding from the parent item and like item embeddings as a weighted sum of the parent item and like item embeddings based on the first and second alignment measurements.

4. The system of claim 1, wherein the at least one processor is further configured to execute program code stored on the memory device to obtain the final dislike item embedding by:
   computing a first alignment measurement between the parent item and dislike item embeddings;
   computing a second alignment measurement between the dislike item embedding and the dislike item embedding itself; and
   computing the final dislike item embedding from the parent item and dislike item embeddings as a weighted sum of the parent item and dislike item embeddings based on the first and second alignment measurements.

5. The system of claim 1, wherein the at least one processor is further configured to execute program code stored on the memory device to feed the first and second vectors into respective first and second fully connected neural network layers, combine outputs of the fully connected neural network layers at a subtraction layer, and input an output of the subtraction layer into a loss layer to compute the probability.

6. A computer-implemented method for implementing separated attention on like and dislike items for personalized ranking, comprising:
   performing, in a first merge layer of a neural network for personalized ranking, an element-wise product on a user embedding and a final like item embedding to generate a first vector, the final like item embedding being computed based on a like item embedding corresponding to a like item associated with a user;
   performing, in a second merge layer of the neural network, an element-wise product on the user embedding and a final dislike item embedding to generate a second vector, the final dislike item embedding being computed based on a dislike item embedding corresponding to a dislike item associated with the user, wherein the like and dislike item embeddings are related to a same parent item embedding via an attention mechanism;
   computing a probability that the user prefers the like item to the dislike item based on the first and second vectors; and
   generating one or more item recommendations including one or more electronic images for the user using the probability.

7. The method of claim 6, further comprising randomly initializing the user embedding.

8. The method of claim 6, wherein obtaining the final like embedding further includes:
   computing a first alignment measurement between the parent item and like item embeddings;
   computing a second alignment measurement between the like item embedding and the like item embedding itself; and
   computing the final like item embedding from the parent item and like item embeddings as a weighted sum of the parent item and like item embeddings based on the first and second alignment measurements.

9. The method of claim 6, wherein obtaining the final dislike embedding further includes:
   computing a first alignment measurement between the parent item and dislike item embeddings;
   computing a second alignment measurement between the dislike item embedding and the dislike item embedding itself; and
   computing the final dislike item embedding from the parent item and dislike item embeddings as a weighted sum of the parent item and dislike item embeddings based on the first and second alignment measurements.

10. The method of claim 6, further comprising feeding the first and second vectors into respective first and second fully connected neural network layers, combining outputs of the fully connected neural network layers at a subtraction layer, and inputting an output of the subtraction layer into a loss layer to compute the probability.

11. A computer program product comprising a non-transitory computer readable storage medium having program instructions embodied therewith, the program instructions executable by a computer to cause the computer to perform a method for implementing separated attention on like and dislike items for personalized ranking, the method performed by the computer comprising:
  performing, in a first merge layer of a neural network for personalized ranking, an element-wise product on a user embedding and a final like item embedding to generate a first vector, the final like item embedding being computed based on a like item embedding corresponding to a like item associated with a user;
  performing, in a second merge layer of the neural network, an element-wise product on the user embedding and a final dislike item embedding to generate a second vector, the final dislike item embedding computed based on a dislike item embedding corresponding to a dislike item associated with the user, wherein the like and dislike item embeddings are related to a same parent item embedding via an attention mechanism;
  computing a probability that the user prefers the like item to the dislike item based on the first and second vectors; and
  generating one or more item recommendations including one or more electronic images for the user using the probability.

12. The computer program product of claim 11, wherein the method further comprises randomly initializing the user embedding.

13. The computer program product of claim 11, wherein obtaining the final like embedding further comprises:
  computing a first alignment measurement between the parent item and like item embeddings;
  computing a second alignment measurement between the like item embedding and the like item embedding itself; and
  computing the final like item embedding from the parent item and like item embeddings as a weighted sum of the parent item and like item embeddings based on the first and second alignment measurements.

14. The computer program product of claim 11, wherein obtaining the final dislike item embedding further comprises:
  computing a first alignment measurement between the parent item and dislike item embeddings;
  computing a second alignment measurement between the dislike item embedding and the dislike item embedding itself; and
  computing the final dislike item embedding from the parent item and dislike item embeddings as a weighted sum of the parent item and dislike item embeddings based on the first and second alignment measurements.

15. The computer program product of claim 11, wherein the method further comprises feeding the first and second vectors into respective first and second fully connected neural network layers, combining outputs of the fully connected neural network layers at a subtraction layer, and inputting an output of the subtraction layer into a loss layer to compute the probability.

* * * * *